US011487643B1

(12) United States Patent
Bade

(10) Patent No.: US 11,487,643 B1
(45) Date of Patent: Nov. 1, 2022

(54) DEBUGGING FOR INTEGRATED SCRIPTING APPLICATIONS

(71) Applicant: Xilinx, Inc., San Jose, CA (US)

(72) Inventor: Stephen L. Bade, Lindon, UT (US)

(73) Assignee: XILINX, INC., San Jose, CA (US)

( * ) Notice: Subject to any disclaimer, the term of this patent is extended or adjusted under 35 U.S.C. 154(b) by 515 days.

(21) Appl. No.: 16/188,230

(22) Filed: Nov. 12, 2018

(51) Int. Cl.
*G06F 11/36* (2006.01)

(52) U.S. Cl.
CPC ........ *G06F 11/362* (2013.01); *G06F 11/3624* (2013.01); *G06F 11/3664* (2013.01)

(58) Field of Classification Search
None
See application file for complete search history.

(56) References Cited

U.S. PATENT DOCUMENTS

| | | | | |
|---|---|---|---|---|
| 5,949,692 A * | 9/1999 | Beausang | ...... | G01R 31/318536 703/15 |
| 6,625,635 B1 * | 9/2003 | Elnozahy | ...... | G06F 9/4881 714/E11.21 |
| 6,721,941 B1 * | 4/2004 | Morshed | ...... | G06F 11/3612 709/217 |
| 6,779,172 B1 * | 8/2004 | Weerawarana | ...... | G06F 9/45504 717/107 |
| 6,836,877 B1 * | 12/2004 | Dupenloup | ...... | G06F 17/5045 716/103 |
| 7,003,751 B1 * | 2/2006 | Stroomer | ...... | G06F 30/30 716/102 |
| 7,032,211 B1 * | 4/2006 | Janzig | ...... | G06F 9/4843 717/115 |
| 7,383,539 B2 * | 6/2008 | Bates | ...... | G06F 11/3644 714/E11.207 |
| 7,426,717 B1 * | 9/2008 | Schang | ...... | G06F 11/3664 714/E11.207 |
| 7,472,378 B2 * | 12/2008 | Bennett | ...... | G06F 11/3664 714/E11.207 |
| 8,402,442 B1 * | 3/2013 | Chan | ...... | G06F 11/3664 714/25 |

(Continued)

OTHER PUBLICATIONS

Tcl Developer Xchange, "TCL: A Platform for Integrated Applications", retrieved from the Internet on Aug. 28, 2018, 3 pages, URL https://www.tcl.tk/doc/integration.html.

*Primary Examiner* — Jason D Mitchell
(74) *Attorney, Agent, or Firm* — Patterson + Sheridan, LLP

(57) ABSTRACT

Methods, systems, and apparatus, including computer programs encoded on computer storage media, for implementing a debugger for integrated scripting applications. One of the methods includes generating a modified script from an original script, the modified script being written in a scripting language and having a respective breakpoint inquiry command for a plurality of original commands from the original script, wherein each breakpoint inquiry command calls a breakpoint inquiry function with a unique identifier assigned to a corresponding original command. The modified script is executed including calling the breakpoint inquiry function before the plurality of original commands from the original script. If a particular call to the breakpoint inquiry function corresponds to a set breakpoint, execution of the modified script is stopped and updated debugging information is provided to a debug client configured to generate a user interface presentation of the updated debugging information.

20 Claims, 3 Drawing Sheets

(56) References Cited

U.S. PATENT DOCUMENTS

| | | | | |
|---|---|---|---|---|
| 8,429,622 | B2* | 4/2013 | Nanjundaswamy | G06F 11/362 717/129 |
| 8,683,444 | B1* | 3/2014 | Spycher | G06F 11/3636 717/125 |
| 9,003,312 | B1* | 4/2015 | Ewe | G06F 8/38 715/762 |
| 9,262,300 | B1* | 2/2016 | Haba | G06F 11/362 |
| 2001/0005852 | A1* | 6/2001 | Bogle | G06F 9/45512 718/102 |
| 2001/0014905 | A1* | 8/2001 | Onodera | G06F 9/52 718/102 |
| 2002/0043667 | A1* | 4/2002 | Shibata | H01L 27/0207 257/202 |
| 2005/0114818 | A1* | 5/2005 | Khakzadi | G06F 9/45512 716/139 |
| 2005/0289396 | A1* | 12/2005 | Hooper | G06F 11/3664 714/34 |
| 2006/0048149 | A1* | 3/2006 | Clift | G06F 9/52 718/100 |
| 2006/0064676 | A1* | 3/2006 | Chavan | G06F 11/3628 717/124 |
| 2007/0061819 | A1* | 3/2007 | Kothari | G06F 9/44 719/328 |
| 2008/0141118 | A1* | 6/2008 | Arkhipov | G06F 11/3644 715/241 |
| 2008/0141226 | A1* | 6/2008 | Girouard | G06F 11/3636 717/128 |
| 2008/0148237 | A1* | 6/2008 | Jiang | G06F 11/3664 717/124 |
| 2009/0003172 | A1* | 1/2009 | Yahata | G11B 19/10 369/53.41 |
| 2009/0089667 | A1* | 4/2009 | Wood | H04N 7/17318 715/273 |
| 2010/0023644 | A1* | 1/2010 | Laffra | G06F 11/362 709/232 |
| 2010/0153927 | A1* | 6/2010 | Stall | G06F 11/3636 717/128 |
| 2010/0153939 | A1* | 6/2010 | Stall | G06F 11/3624 717/158 |
| 2010/0162212 | A1* | 6/2010 | Stall | G06F 11/3664 717/124 |
| 2010/0263036 | A1* | 10/2010 | Mondal | H04L 67/34 726/8 |
| 2011/0252402 | A1* | 10/2011 | Sanoy | G06F 3/04845 717/120 |
| 2012/0023483 | A1* | 1/2012 | Welchman | G06F 11/3676 717/125 |
| 2012/0110555 | A1* | 5/2012 | Bates | G06F 11/362 717/129 |
| 2016/0182604 | A1* | 6/2016 | Ensign | H04L 67/025 709/217 |
| 2016/0266997 | A1* | 9/2016 | Kandpal | G06F 11/3636 |
| 2016/0328308 | A1* | 11/2016 | Pywell | G06F 11/3664 |
| 2018/0121323 | A1* | 5/2018 | Tucker | G06F 11/3636 |
| 2018/0196732 | A1* | 7/2018 | Dolev | G06F 11/3612 |

* cited by examiner

DEBUGGING FOR INTEGRATED SCRIPTING APPLICATIONS

TECHNICAL FIELD

This specification relates to script debuggers.

BACKGROUND

Many computer application programs, or for brevity, applications, have integrated scripting functionality. Integrated scripting functionality allows a developer or user to write a script in a particular scripting language that automates some features of the application. For example, a spreadsheet application can have integrated scripting functionality that allows scripts to be written that manipulate cells of a spreadsheet. Typically, the scripting language is a different programming language than the language in which the application is written. Commonly used scripting languages include JavaScript, TCL, Python, and VBScript.

To provide integrated scripting functionality, an interpreter for the script must recognize some commands that have the ability to read from, write to, and modify objects that are generated and used by the running application. Thus, in the spreadsheet example, a first script command can read the value of a particular cell that was written by the application and store the value in a variable of the scripting language. The script can then perform a user-provided function in the scripting language using the read value. A second script command can then write a resulting value back to a particular cell in the spreadsheet, which can be used by the running application. This is called extending the scripting language, which means adding new script commands that are specific to the host application.

Integrated scripting functionality relies on a script interpreter. In this specification, a script interpreter is a computer program that is embedded in or integrated with an application and which provides the capability of executing commands that read values from objects generated by the application and write values to objects that can be used by the application. Script interpreters can also provide other object manipulation capabilities, e.g., the capability to create, delete, or modify objects that are generated by or used by the application. This is called embedding the script interpreter in an application. Many scripting languages can be extended and embedded.

Sometimes in addition to extending a scripting language by adding custom commands, the script interpreter itself is also modified. This can be done to improve performance or to provide features to allow access to internal program objects. These changes can provide required functionality to the custom scripting language and host application, but these changes often make the modified script interpreter incompatible with commercially available debuggers for the particular scripting language. This is because commercial debuggers that are designed for the scripting language may lack the ability to successfully intercept and interface with internal mechanisms for manipulating application objects. Such mechanisms are typically different from the internal mechanisms used to access variables of the scripting language. For example, when a script variable refers to the name of an application object, a commercial debugger usually lacks the ability to use that name to locate the actual object stored in memory. Without the ability to locate objects in memory, commercial debuggers often cannot provide inspection capabilities for application objects referenced in the script. Another example is the commercial debugger may break the connection between the name of an object and the actual object in memory, which then causes script errors when the actual object is needed.

Some applications provide script debuggers that can provide debugging capabilities for the embedded script interpreter. Common debugging capabilities include setting and removing breakpoints, continuing execution (until the next breakpoint), stepping over commands, stepping into function calls, stepping out of function calls, and pausing. Other common debugging capabilities relate to inspecting, setting, and monitoring variables and their assigned values.

However script debuggers require close integration with the underlying script interpreter. Therefore, for many applications that provide integrated scripting capabilities with a modified script interpreter, these common debugging capabilities are simply not available. Even when a commercial debugger is available, the work to integrate it into the application and provide access to it is sometimes prohibitive. As a result, developers who are developing scripts to be used with a modified script interpreter often have to rely on so-called "printf debugging," which involves modifying the script itself to manually insert statements that output the values of variables to the user, e.g., using popup message boxes. This has numerous drawbacks, including the fact that none of the above-mentioned debugging capabilities are available. In addition, using printf debugging intermingles debugging code with actual script functionality. Therefore, when the script has been tested to the satisfaction of the developer, the output statements must be manually disabled or removed, which introduces more inefficiency into the process.

SUMMARY

This specification describes how a system can provide debugging functionality for integrated scripting applications without relying on a commercial or third party script debugger, since that may not be an option if the script interpreter is modified. In addition, due to its simplicity this method may provide benefits even when integrating a third party script debugger is possible. To do so, the system can generate a modified script that communicates with a script debugger to provide debugging functionality.

In general, one innovative aspect of the subject matter described in this specification can be embodied in methods that include the actions of receiving an original script written in a scripting language for execution by a script interpreter that is integrated with an application, wherein the script interpreter is configured to execute script commands using values read from objects generated by the application; generating a modified script from the original script, the modified script being also written in the scripting language and having a respective breakpoint inquiry command for a plurality of original commands from the original script, wherein each breakpoint inquiry command calls a breakpoint inquiry function with a unique identifier assigned to a corresponding original command; executing the modified script including calling the breakpoint inquiry function before the plurality of original commands from the original script; determining that a particular call to the breakpoint inquiry function corresponds to a set breakpoint; in response, stopping execution of the modified script and providing updated debugging information to a debug client configured to generate a user interface presentation of the updated debugging information. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. In particular, one embodiment includes all the following features in combination. Stopping execution of the modified script comprises executing a variable wait function that pauses script execution until a value of a particular variable is modified. The actions include receiving an indication that execution should resume; and in response, modifying the value of the particular variable to cause the variable wait function to stop waiting. The application is written in a different programming language than the original script and the modified script. Determining that a particular call to the breakpoint inquiry function corresponds to the set breakpoint comprises: maintaining a set of unique identifiers that correspond to breakpoint locations; receiving, as a parameter to the particular call to the breakpoint inquiry function, a particular unique identifier assigned to an original command in the original script; and determining that the unique identified assigned to the original command in the original script occurs in the set of unique identifiers that correspond to set breakpoints. Generating the modified script comprises assigning a unique identifier to a plurality of commands in the original script. The actions include receiving a request for status of a particular variable as of a time that execution of the modified script was stopped; querying the script interpreter for a status of the particular variable; and providing the status of the particular variable to the debug client for display to a user. The actions include receiving a request to execute a custom script command that corresponds to functionality provided by the application; and in response, providing the custom script command to the script interpreter for execution and showing the status or result of the executed command. The custom script command creates, modifies, or deletes an object that can be used by the application. The objects correspond to elements of an integrated circuit design. The application does not have integrated custom debugging functionality. The script interpreter is incompatible with third-party debuggers.

Particular embodiments of the subject matter described in this specification can be implemented so as to realize one or more of the following advantages. A system can provide a debugger for an integrated scripting application in a way that is transparent to the user and without needing to modify the script interpreter or the principal application (aside from adding the debugger). This approach also increases compatibility as the debugger can be used with legacy software without an update.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
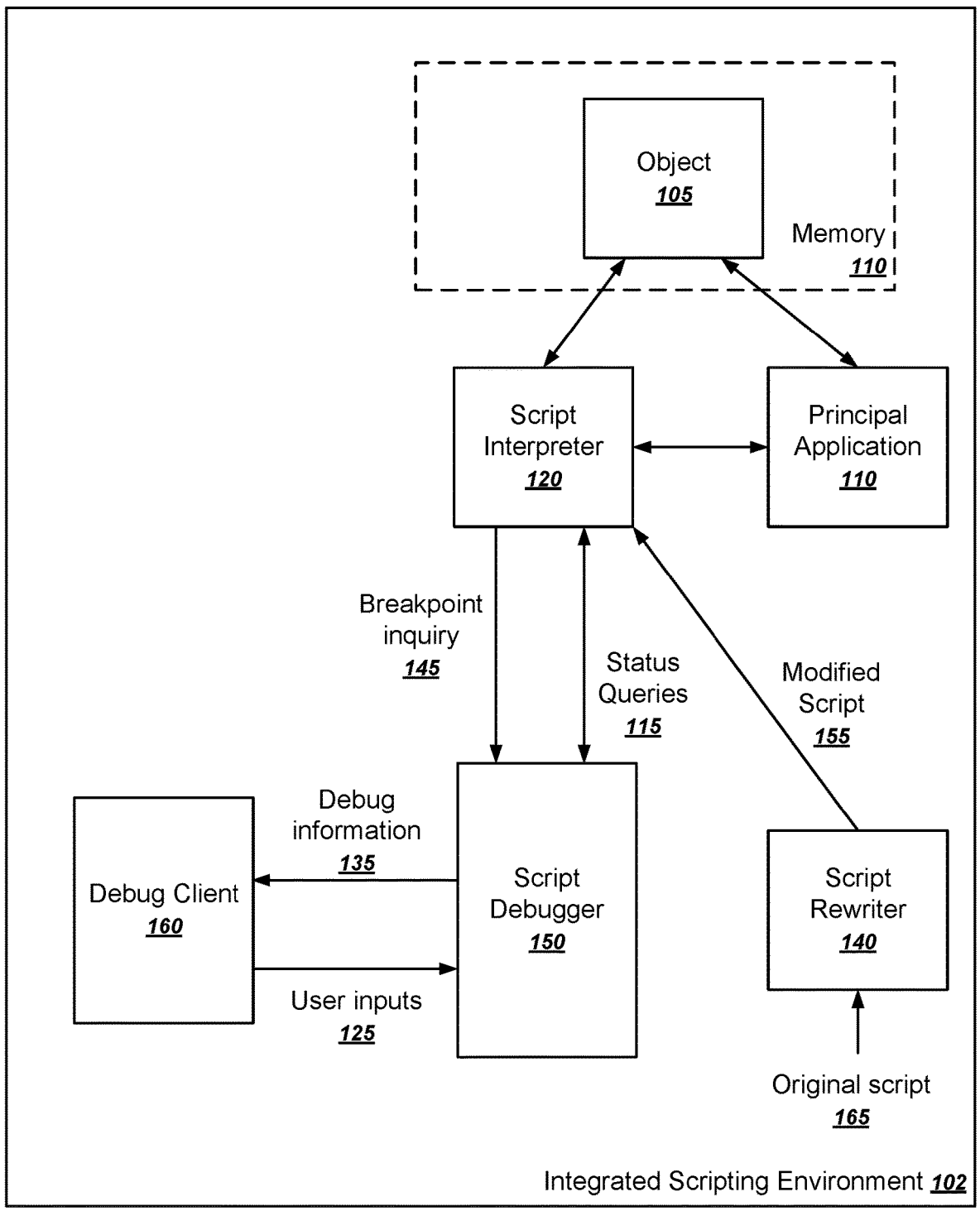
FIG. 1 illustrates an example integrated scripting environment.

FIG. 1 illustrates an example integrated scripting environment 102. The environment 102 includes a principal application 110 and a modified script interpreter 120 that allows user-provided scripts written in a particular scripting language to automate certain features of the principal application 110. This functionality includes the ability for the modified script interpreter to provide commands to the principal application 110 and to access and manipulate in-memory objects generated by or consumed by the principal application 110, e.g., the object 105. There are many different types of applications that benefit from integrated scripting functionality. One such example is applications for electronic design automation, in which creating or working with thousands or millions of objects representing electronic components is too tedious to be done manually.

The environment 102 also includes a script rewriter 140, a script debugger 150, and a debug client 160. The components of the environment 102 can be implemented as computer programs installed on one or more computers in one or more locations. These components can all be different modules of the same application or application suite. Alternatively or in addition, some of the components can execute on different computers that are coupled to each through a network.

The script rewriter 140 can receive an original script 165 written in a scripting language supported by the modified script interpreter 120. The script rewriter 140 can then modify the script to enable debugging functionality through the script debugger 150 in a way that does not require the application suite to have an integrated script debugger.

The script rewriter 140 can use the original script 165 to generate a modified script 155 that is written entirely in the same scripting language and is therefore executable by the modified script interpreter 120.

The script rewriter 140 can modify the original script 165 to support debugging by inserting commands in the original script 165 that invoke the script debugger 150. Thus, before executing a command that occurred in the original script 165, the modified script interpreter 120 is directed to provide a breakpoint inquiry 145 to the script debugger 150.

The script debugger 150 maintains a current debugging state of the script being executed, which can include, for example, the locations of breakpoints, and variables and functions being monitored, to name just a few examples.

Thus, the breakpoint inquiry 145 causes the script debugger 150 to determine whether or not the current execution progress of the script has reached a point where a breakpoint is set by the script debugger 150, or if the script execution should pause for any reason, e.g., due to a 'step' command. If an active breakpoint has not been reached, the script debugger 150 returns control to the modified script interpreter 120 to execute the next command in the modified script 155.

If an active breakpoint has been reached, the script debugger 150 pauses execution by the modified script interpreter 120 and provides debug information 135 to the debug client 160. The debug information 135 can include the command currently being executed.

The debug client 160 generates a user interface presentation for a user of the integrated scripting environment 102. The user interface presentation can provide information about the command currently being executed as well as the status of variables in the script being executed, and any other relevant state or other information. The user interface presentation can present this information in tandem with displaying the source code of the original script 165 in order to help the user visualize where execution of the script has stopped.

A user can use the debug client 160 to provide a variety of user inputs 125 back to the script debugger 150. The user inputs 125 can correspond to debugging operations. For example, the user inputs can be requests to set and remove breakpoints, continue execution, step over a command, step into a function call, step out of a function call, and pausing script execution.

The user input 125 can also include a request for the status of variables in the executing script. In order to obtain this information, the script debugger 150 can query the modified script interpreter 120 with status queries 115 that request current values of variables in the script. The script debugger 150 can then receive the values of the variables and provide the values as additional debug information 135.

The user input 125 can also be a request to execute a custom command that corresponds to functionality of the principal application 110. For example, the user input can request that a custom command be executed by the modified script interpreter 120 that causes (for example) the creation, deletion, or modification of the object 105.

As illustrated by FIG. 1, inserting debug related script commands in a script, and executing the modified script can provide debugging capabilities for an integrated scripting environment that otherwise are unavailable.

In order to provide cross-platform support, the components illustrated in FIG. 1 can be implemented using a client/server architecture in which the debug client 160 is implemented as an HTTP client and a web server handles backend communications with the other components of the system.

Figure 2:
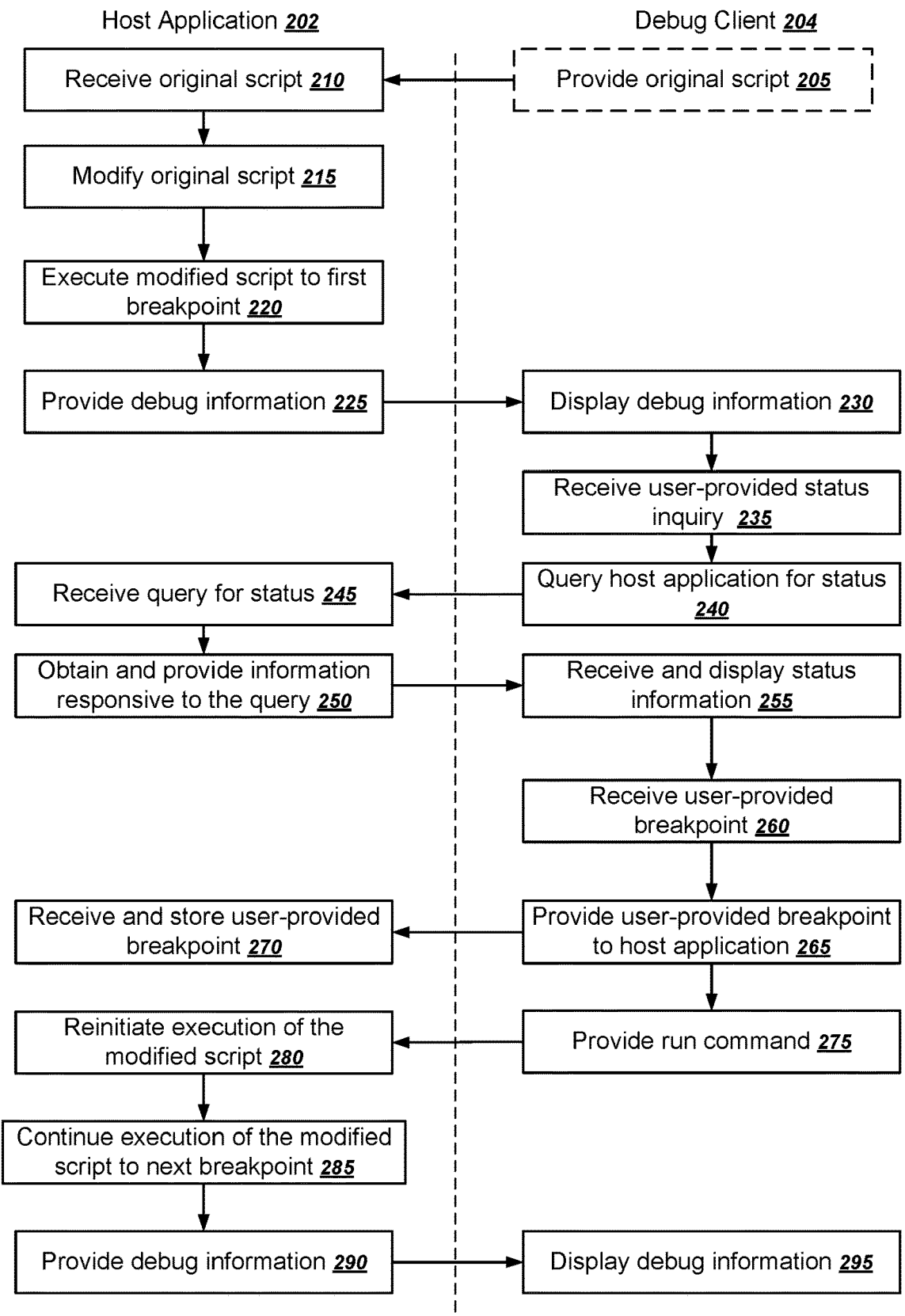
FIG. 2 is a flowchart of an example information flow for a client/server architecture.

FIG. 2 is a flowchart of an example information flow for a client/server architecture. In FIG. 2, the host application 202 implements a server that handles requests from the debug client 204. Thus, the host application 202 in FIG. 2 includes a script debugger, e.g., the script debugger 150 of FIG. 1; a script rewriter, e.g., the script rewriter 140 of FIG. 1; and a modified script interpreter, e.g., the modified script interpreter 120 of FIG. 1.

The debug client 204 optionally provides an original script to the host application 202 (205). For example, a user can use a web interface presented by the debug client to enter or upload a script in a scripting language. The debug client 204 can then provide the original script to the host application 202.

The host application 202 receives the original script (210). The host application 202 can receive the original script from the debug client 204. Alternatively, the host application 202 can obtain the original script from another source, e.g., a local or online preexisting script library, a file on disk, from the host application's installation, etc.

The host application 202 modifies the original script (215). As described above, the host application 202 can rewrite the script to add one or more commands to the original script with calls to the script debugger.

TABLE 1 includes a pseudocode example of an original script. This example uses the TCL script syntax.

TABLE 1

| Line | Script |
|------|--------|
| 1 | set n 1 |
| 2 | incr n |
| 3 | puts "n is $n" |

On line 1, the original script sets the variable n to the value of 1.

On line 2, the original script increments the value of n. In other words, the script reads the currently assigned value of n, adds one, and reassigns the value of to be the incremented value.

On line 3, the original script outputs a string that displays the value of n. In this case, line 3 would output the following string, "n is 2".

TABLE 2 includes a pseudocode example of a modified script.

TABLE 2

| Line | Script |
|------|--------|
| 1 | set ::_dbg_ctrl 0 |
| 2 | [ if {::bp 1} {vwait ::_dbg_ctrl}]; set n 1 |
| 3 | [ if {::bp 2} {vwait ::_dbg_ctrl}]; incr n |
| 4 | [ if {::bp 3} {vwait ::_dbg_ctrl}]; puts "n is $n" |

On line 1, the modified script sets a global flag named "_dbg_ctrl" to zero. This flag will be used to determine whether or not to continue execution.

On line 2, the modified script includes an additional command before the original statement. This command is a breakpoint inquiry command that calls a breakpoint inquiry function "bp" with a unique identifier assigned to the command in the original script. In this case, the unique identifier is the value 1. The breakpoint inquiry function uses the unique identifier of the original command to determine whether or not a breakpoint has been set for that original command.

When executed, the breakpoint inquiry function performs two tasks: first, it informs the script debugger of the execution progress by providing the script debugger with the unique identifier that the breakpoint inquiry function was called with. In addition, the breakpoint inquiry function determines whether or not the unique identifier corresponds to a set breakpoint. As described above, the script debugger maintains a state of the current debugger, including the identifiers of all commands that are associated with set breakpoints.

If the breakpoint inquiry function returns true, in the modified script the script interpreter will execute a variable wait command, in this example, "vwait." The variable wait command pauses execution until the value of the named variable is modified. In this example, the variable wait command waits for the global flag "_dbg_ctrl" to be modified.

When the user wants to resume execution of the program, the script debugger will modify the global flag, which causes execution of the modified script to resume.

Lines 3 and 4 of the modified script contain similar debugging statements that implicitly assign unique identifies to each command in the original script.

As shown in FIG. 2, the host application 202 executes the modified script to the first breakpoint location (220). This causes the host application 202 to continually execute the debugging statements that were inserted into the modified script. This occurs until the host application 202 encounters a command that was assigned a unique identifier corresponding to a set breakpoint. At this point the script execution pauses, in order to provide information to the debug client.

Upon the script encountering the first breakpoint command or any breakpoint having a unique identifier corresponding to a set breakpoint, the host application 202 provides debug information to the debug client 204 (225). The debug information can include the unique identifier of a most recently executed command, in addition to any appropriate information about the values of variables in the program.

The debug client 204 displays the debug information (230). The debug client 204 can display the debug information using any appropriate user interface, including a web based interface that displays debug information in a webpage format. At this point, execution of the modified script has been halted, and the user can issue debugging commands through the debug client 204 in order to inspect aspects of the program.

For example, the debug client 204 can receive a user-provided status inquiry (235). The status inquiry can request a current status for a particular variable or a particular function in the original script.

The debug client 204 can then query the host application for status (240), and the host application 202 can receive the query for status (245). The debug client 204 and the host application 202 can communicate using any appropriate interprocess communications protocol, including HTTP.

The host application 202 obtains and provides information responsive to the query (250). As part of this process, the host application can query an underlying modified script interpreter that is executing the modified script in order to obtain status information for variables and functions being executed.

The debug client 204 receives and displays the status information corresponding to the original status inquiry (255). For example, the debug client 204 can provide a web interface that displays a result, e.g., an updated variable value, of the status inquiry.

Notably, this process can allow the debug client to obtain information relating to values of objects set by the principal application. In other words, the debug client has full capability to inspect and modify the in-memory objects used by the principal application. For example, the system can provide an object browser that lists objects, which can optionally be grouped by category and type. A user can use the object browser to view object properties and related objects.

Setting breakpoints is another example of user inputs that can be handled while execution is running or halted. For example, the debug client 204 can receive a user-provided breakpoint (260). Within the user interface seen by the user, the debug client 204 can display a representation of the source code of the original script. Next to each command can be a graphical indicator of whether or not the command is associated with a currently set breakpoint, and a user can interact with the displayed commands in order to toggle breakpoints on and off.

The debug client 204 can provide the user-provided breakpoint to the host application 202 (265). As described above, the modified script assigns each command in the original script a unique identifiers. Therefore, the debug client 204 can provide the user-provided breakpoint as a unique identifier corresponding to the command selected for a breakpoint.

The host application 202 receives and stores the user-provided breakpoint (270).

The debug client 204 can then resume execution of the program by providing a run command to the host application 202 (275).

The host application 202 receives the run command and reinitiates execution of the modified script (280). As described above, the host application 202 can reinitiate execution by signaling to the modified script interpreter to continue execution. In some implementations, this can be performed by modifying the value of a variable that the modified script instructed the script interpreter to wait on, e.g., by use of a variable wait command.

The host application 202 continues execution of the modified script to the next breakpoint (285). As part of this process, the extra commands added to the modified script will continually cause the script debugger to determine whether a command has been reached that is associated with a breakpoint, including the user-provided breakpoint that was stored as part of step 270 above.

Upon reaching a breakpoint, the host application 202 provides debug information back to the debug client 204 (290), and the debug client 204 displays the debug information to the user (295).

Figure 3:
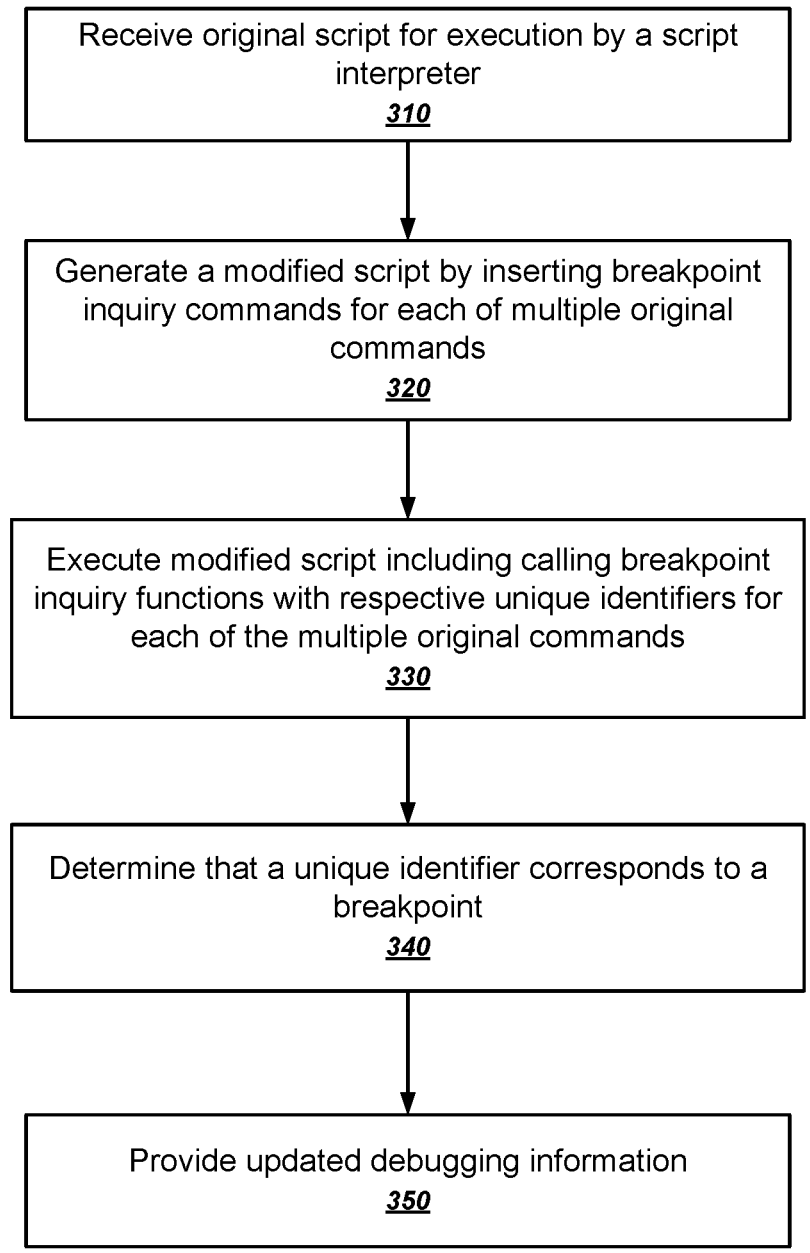
FIG. 3 is a flowchart of an example process for providing debugging in an integrated scripting environment.

FIG. 3 is a flowchart of an example process for providing debugging in an integrated scripting environment. The example process will be described as being performed by a system of one or more computers in one or more locations, programmed appropriately in accordance with this specification.

The system receives an original script for execution by a script interpreter (310). As described above, a modified script interpreter is configured to execute custom script commands that effectuate functionality in a principal application. Because of the close integration of the modified script interpreter with the principal application, the original script may not be usable by commercial debuggers.

The system generates a modified script from the original script by inserting breakpoint inquiry commands for each of multiple original commands (320). As described above, each breakpoint inquiry command calls a breakpoint inquiry function with a unique identifier assigned to the corresponding original command.

The system executes the modified script which includes calling the breakpoint inquiry functions with respective unique identifiers for each of the multiple original commands (330). Executing the modified script causes the modified script interpreter to call the breakpoint inquiry function before each of the plurality of commands using the unique identifier assigned to each command.

The system determines that a unique identifier corresponds to a breakpoint (340). For example, a script debugger can maintain a state of the debugger and can determine whether or not each unique identifier passed to the breakpoint inquiry function corresponds to an enabled (or set) breakpoint.

If so, the system provides updated debugging information (350). As described above, the system can provide the updated debugging information to a debug client that is configured to generate a user interface presentation to present the updated debugging information.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:
receiving an original script written in a scripting language for execution by a script interpreter that is integrated with an application, wherein the script interpreter is configured to execute script commands using values read from objects generated by the application;
generating a modified script from the original script, the modified script being also written in the scripting language and having a breakpoint inquiry command before each of a plurality of original commands from the original script, wherein each breakpoint inquiry command calls a breakpoint inquiry function with a unique identifier assigned to a corresponding original command;
executing the modified script including calling the breakpoint inquiry function before each of the plurality of original commands from the original script;
determining that a particular call to the breakpoint inquiry function corresponds to a set breakpoint; and
upon determining the particular call corresponds to the set breakpoint, stopping execution of the modified script and providing updated debugging information to a debug client configured to generate a user interface presentation of the updated debugging information.

2. The method of claim 1, wherein stopping execution of the modified script comprises executing a variable wait function that pauses script execution until a value of a particular variable is modified.

3. The method of claim 2, further comprising:
receiving an indication that execution should resume; and
in response, modifying the value of the particular variable to cause the variable wait function to stop waiting.

4. The method of claim 1, wherein the application is written in a different programming language than the original script and the modified script.

5. The method of claim 1, wherein determining that a particular call to the breakpoint inquiry function corresponds to the set breakpoint comprises:
maintaining a set of unique identifiers that correspond to breakpoint locations;
receiving, as a parameter to the particular call to the breakpoint inquiry function, a particular unique identifier assigned to an original command in the original script; and
determining that the unique identifier assigned to the original command in the original script occurs in the set of unique identifiers that correspond to set breakpoints.

6. The method of claim 1, wherein generating the modified script comprises assigning a unique identifier to a plurality of commands in the original script.

7. The method of claim 1, further comprising:
receiving a request for status of a particular variable as of a time that execution of the modified script was stopped;
querying the script interpreter for a status of the particular variable; and
providing the status of the particular variable to the debug client for display to a user.

8. The method of claim 1, further comprising:
receiving a request to execute a custom script command that corresponds to functionality provided by the application; and
in response, providing the custom script command to the script interpreter for execution and showing the status or result of the executed command.

9. The method of claim 8, wherein the custom script command creates, modifies, or deletes an object that can be used by the application.

10. The method of claim 8, wherein the objects correspond to elements of an integrated circuit design.

11. The method of claim 1, wherein the application does not have integrated debugging functionality.

12. A system comprising:
one or more computers and one or more storage devices storing instructions that are operable, when executed by the one or more computers, to cause the one or more computers to perform operations comprising:
receiving an original script written in a scripting language for execution by a script interpreter that is integrated with an application, wherein the script interpreter is configured to execute script commands using values read from objects generated by the application;
generating a modified script from the original script, the modified script being also written in the scripting language and having a breakpoint inquiry command before each of a plurality of original commands from the original script, wherein each breakpoint inquiry command calls a breakpoint inquiry function with a unique identifier assigned to a corresponding original command;
executing the modified script including calling the breakpoint inquiry function before each of the plurality of original commands from the original script;
determining that a particular call to the breakpoint inquiry function corresponds to a set breakpoint; and
in response, stopping execution of the modified script and providing updated debugging information to a debug client configured to generate a user interface presentation of the updated debugging information.

13. The system of claim 12, wherein stopping execution of the modified script comprises executing a variable wait function that pauses script execution until a value of a particular variable is modified.

14. The system of claim 13, wherein the operations further comprise:
receiving an indication that execution should resume; and
in response, modifying the value of the particular variable to cause the variable wait function to stop waiting.

15. The system of claim 12, wherein the application is written in a different programming language than the original script and the modified script.

16. The system of claim 12, wherein determining that a particular call to the breakpoint inquiry function corresponds to the set breakpoint comprises:
maintaining a set of unique identifiers that correspond to breakpoint locations;
receiving, as a parameter to the particular call to the breakpoint inquiry function, a particular unique identifier assigned to an original command in the original script; and
determining that the unique identifier assigned to the original command in the original script occurs in the set of unique identifiers that correspond to set breakpoints.

17. The system of claim 12, wherein generating the modified script comprises assigning a unique identifier to a plurality of commands in the original script.

18. The system of claim 12, wherein the operations further comprise:
receiving a request for status of a particular variable as of a time that execution of the modified script was stopped;
querying the script interpreter for a status of the particular variable; and
providing the status of the particular variable to the debug client for display to a user.

19. The system of claim 12, wherein the script interpreter is only compatible with the system.

20. A computer program product, encoded on one or more non-transitory computer storage media, comprising instructions that when executed by one or more computers cause the one or more computers to perform operations comprising:
receiving an original script written in a scripting language for execution by a script interpreter that is integrated with an application, wherein the script interpreter is configured to execute script commands using values read from objects generated by the application;
generating a modified script from the original script, the modified script being also written in the scripting language and having a breakpoint inquiry command before each of a plurality of original commands from the original script, wherein each breakpoint inquiry command calls a breakpoint inquiry function with a unique identifier assigned to a corresponding original command;
executing the modified script including calling the breakpoint inquiry function before each of the plurality of original commands from the original script;
determining that a particular call to the breakpoint inquiry function corresponds to a set breakpoint; and
upon determining the particular call corresponds to the set breakpoint, stopping execution of the modified script and providing updated debugging information to a debug client configured to generate a user interface presentation of the updated debugging information.

\* \* \* \* \*